United States Patent
Oba et al.

(10) Patent No.: US 12,017,201 B2
(45) Date of Patent: Jun. 25, 2024

(54) HIGH-STRENGTH ZEOLITE MOLDING AND PRODUCTION METHOD THEREFOR

(71) Applicant: TOSOH CORPORATION, Yamaguchi (JP)

(72) Inventors: Yuki Oba, Yamaguchi (JP); Keisuke Tokunaga, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 329 days.

(21) Appl. No.: 17/620,085

(22) PCT Filed: Jun. 17, 2020

(86) PCT No.: PCT/JP2020/023729
§ 371 (c)(1),
(2) Date: Dec. 16, 2021

(87) PCT Pub. No.: WO2020/256006
PCT Pub. Date: Dec. 24, 2020

(65) Prior Publication Data
US 2022/0362739 A1    Nov. 17, 2022

(30) Foreign Application Priority Data

Jun. 20, 2019   (JP) ................. 2019-114469

(51) Int. Cl.
| | |
|---|---|
| *B01J 20/18* | (2006.01) |
| *B01J 20/12* | (2006.01) |
| *B01J 20/28* | (2006.01) |
| *B01J 20/30* | (2006.01) |

(52) U.S. Cl.
CPC .............. *B01J 20/18* (2013.01); *B01J 20/12* (2013.01); *B01J 20/28011* (2013.01); *B01J 20/2803* (2013.01); *B01J 20/3014* (2013.01); *B01J 20/3042* (2013.01); *B01J 20/3078* (2013.01)

(58) Field of Classification Search
CPC ....... Y02A 50/20; C01B 39/026; C01B 39/26; C01B 39/24; C01B 39/46; C01B 39/36; C01B 39/38; C01B 39/32; C01B 39/44; B01J 20/12; B01J 20/18; B01J 20/282; B01J 20/283; B01J 20/2803; B01J 20/28011; B01J 20/3014; B01J 20/3042; B01J 20/3078; B01J 20/3021; B01J 20/3064
USPC ........................ 502/400, 407, 414, 415, 503
See application file for complete search history.

(56) References Cited

U.S. PATENT DOCUMENTS

| | | |
|---|---|---|
| 5,316,993 A | 5/1994 | Sextl et al. |
| 2005/0261122 A1 | 11/2005 | Quesada Perez et al. |

FOREIGN PATENT DOCUMENTS

| | | |
|---|---|---|
| JP | H5138016 A | 6/1993 |
| JP | 2001321673 A | 11/2001 |
| JP | 2004123411 A | 4/2004 |
| JP | 2006334454 A | 12/2006 |
| JP | 2018-111643 A | 7/2018 |
| JP | 2019501766 A | 1/2019 |

OTHER PUBLICATIONS

International Preliminary Report on Patentability in PCT/JP2020/023729 dated Dec. 21, 2021, 4pp.
E.M. Farfan-Torres et al., "Pillared Clays : Preparation and Characterization of Zirconium Pillared Montmorillonite", Catalysis Today, 1992, pp. 515-526, vol. 15, Elsevier Science Publishers B.V. Amsterdam, 12pp.
Extended European Search Report in EP application No. 20825606.5, mailed Jul. 14, 2023, 7pp.

*Primary Examiner* — Elizabeth D Wood
(74) *Attorney, Agent, or Firm* — HAUPTMAN HAM, LLP

(57) ABSTRACT

A high-strength zeolite molding includes 10 parts by weight or more and 40 parts by weight or less of clay relative to 100 parts by weight of zeolite, and having a compressive strength of 20 N or more, in which the zeolite contains at least one zeolite that has $Si/Al_2$ of 300 or more and 100000 or less and a water adsorption amount of 10 (g/100 g) or less under conditions of 25° C. and a relative pressure of 0.5, and the clay contains at least one clay that has a solid acidity of 0.15 mmol/g or less as determined by a $NH_3$-TPD method. A method for producing includes kneading, molding, drying and disintegrating a product and then firing at 400° C. or higher and 700° C. or lower.

5 Claims, No Drawings

HIGH-STRENGTH ZEOLITE MOLDING AND PRODUCTION METHOD THEREFOR

RELATED APPLICATIONS

The present application is a National Phase of International Application No. PCT/JP2020/023729, filed Jun. 17, 2020, which claims priority to Japanese Application No. 2019-114469, filed Jun. 20, 2019.

TECHNICAL FIELD

The present invention relates to a high-strength zeolite molding and a production method therefor, and particularly relates to a high-strength zeolite molding that uses a low-acidity clay binder and a production method therefor. The high-strength zeolite molding of the present invention is useful as, for example, an adsorptive separation agent or the like.

BACKGROUND ART

In recent years, regulations on emission of VOC, which are one of the causative agents of airborne particulate matters and photochemical oxidants, have started, and the technology that addresses VOC emission has gathered much attention. Zeolite has attracted attention as a VOC adsorbent. Since the framework is composed of highly heat resistant silicon dioxide, VOC adsorption and desorption at high temperature are smooth, the safety is high and the specific surface area is large. Moreover, pores in zeolite are even and can separate particular VOC by adsorption. When zeolite is used in adsorptive separation, zeolite is molded into a pellet shape, a bead shape, a honeycomb shape or the like and used since zeolite in powder form is difficult to handle. When zeolite is used for the purpose of adsorptive separation, zeolite is packed in a column or a fluid bed and used; thus, zeolite needs to be processed into a molding that has sufficient physical strength. In particular, a molding having low strength and thus causes powdering due to long-term use is not preferable since equipment malfunction will result. Since zeolite used alone has low plasticity and is difficult to mold into a desired shape or a molding having high strength, a binder is often used. Clay, silica sol, alumina and the like are used as the binder. These binders are not used in adsorptive separation, but may cause degradation of adsorptive separation performance. For example, when clay or alumina having an acid site is used as the binder to separate an aromatic hydrocarbon by adsorption, the aromatic hydrocarbon reacts, and possibly the target aromatic hydrocarbon may not be separated. As measures for preventing degradation of the adsorptive separation performance caused by the binder, measures such as eliminating the binder from the molding and converting the binder into zeolite have been taken. For example, in PTL 1, a green body composed of a kaolin clay binder and FAU zeolite is prepared and then heat-treated to convert the kaolin clay binder into a meta-kaolin clay binder, and, after addition of a hydroxide source, a hydrothermal process is performed to convert non-zeolite components into FAU zeolite so as to obtain a binderless zeolite adsorbent.

Furthermore, in PTL 2, after a source substance that contains an aluminum component, an alkali metal component and a tetraalkylammonium component is supported on a silica molding, the zeolite precursor is brought into contact with saturated water vapor to convert the silica component into zeolite and to thereby obtain a binderless zeolite molding.

However, these techniques have issues such as extremely complicated steps and economical disadvantages. Furthermore, these binderless zeolite moldings have lower strength than binder-containing zeolite moldings, and equipment malfunction caused by powdering may occur.

CITATION LIST

Patent Literature

PTL 1: Japanese Unexamined Patent Application Publication (Translation of PCT Application) No. 2019-501766
PTL 2: Japanese Unexamined Patent Application Publication No. 2006-334454

SUMMARY OF INVENTION

Technical Problem

The present invention provides a high-strength zeolite molding that uses a low-acidity clay binder that can be produced by a simple and less expensive method than existing methods, and a production method therefor. The high-strength zeolite molding of the present invention can be used in a variety of adsorptive separation usages.

Solution to Problem

The present inventors have conducted extensive studies to address the aforementioned issues, have found a solution to the issues and have completed the present invention.

In other words, the present invention involves the following [1] to [5].

[1] A high-strength zeolite molding comprising 10 parts by weight or more and 40 parts by weight or less of clay relative to 100 parts by weight of zeolite, and having a compressive strength of 20 N or more, wherein the zeolite contains at least one zeolite that has $Si/Al_2$ of 300 or more and 100000 or less and a water adsorption amount of 10 (g/100 g) or less under conditions of 25° C. and a relative pressure of 0.5, and the clay contains at least one clay that has a solid acidity of 0.15 mmol/g or less as determined by a $NH_3$-TPD method.

[2] A method for producing the high-strength zeolite molding described in [1] above, the method comprising adding, to 100 parts by weight of zeolite, 10 parts by weight or more and 40 parts by weight or less of clay, 1 part by weight or more and 5 parts by weight or less of a molding aid, 0.5 parts by weight or more and 5 parts by weight or less of a water-soluble sodium salt and 60 parts by weight or more and 100 parts by weight or less of water, kneading the resulting mixture to obtain a kneaded product containing these, molding and then drying the kneaded product, disintegrating the obtained zeolite green body and then firing the disintegrated green body at 400° C. or higher and 700° C. or lower, wherein the zeolite contains at least one zeolite that has $Si/Al_2$ of 300 or more and 100000 or less and a water adsorption amount of 10 (g/100 g) or less under conditions of 25° C. and a relative pressure of 0.5, and the clay contains at least one clay that has a solid acidity of 0.15 mmol/g or less as determined by a $NH_3$-TPD method.

[3] The method for producing the high-strength zeolite molding described in [2] above, wherein 20 parts by weight or less of a pore forming agent is further added to 100 parts by weight of the zeolite.

[4] The method for producing the high-strength zeolite molding described in [2] or [3] above, wherein the zeolite contains at least one zeolite selected from beta zeolite, Y zeolite, L zeolite, ferrierite zeolite, mordenite zeolite and ZSM-5 zeolite.

[5] The method for producing the high-strength zeolite molding described in [2] above, wherein the clay contains at least one selected from bentonite clay, sepiolite clay, attapulgite clay, palygorskite clay and synthetic layered silicate (smectite clay).

Advantageous Effects of Invention

Since the binder acidity is low and the reactivity with organic substances is low, the high-strength zeolite molding of the present invention is particularly useful in adsorptive separation usages without causing side reaction. In addition, since the high-strength zeolite molding of the present invention has high strength, powdering is less likely to occur even when the molding is used in adsorptive separation, and equipment malfunction and the like rarely occur.

DESCRIPTION OF EMBODIMENTS

The present invention will now be described in detail.

The high-strength zeolite molding of the present invention comprises 10 parts by weight or more and 40 parts by weight or less of clay relative to 100 parts by weight of zeolite.

Zeolite contained in the high-strength zeolite molding is a zeolite that has $Si/Al_2$ of 300 or more and 100000 or less and a water adsorption amount of 10 (g/100 g) or less under conditions of 25° C. and a relative pressure of 0.5, and at least one such zeolite is contained. When $Si/Al_2$ is less than 300, the affinity between zeolite and water is high, and adsorption of VOC and the like may be obstructed. When the water adsorption amount under the conditions of 25° C. and a relative pressure of 0.5 exceeds 10 (g/100 g), the affinity between zeolite and water is high, and adsorption of VOC and the like may be obstructed. $Si/Al_2$ is preferably 500 or more and 10000 or less and more preferably 1000 or more and 2000 or less. Under the conditions of 25° C. and a relative pressure of 0.5, the water adsorption amount is preferably 5 (g/100 g) or less. Examples of the type of zeolite include beta zeolite, Y zeolite, L zeolite, ferrierite zeolite, mordenite zeolite and ZSM-5 zeolite, and ZSM-5 zeolite is preferable.

The amount of clay contained in the high-strength zeolite molding is 10 parts by weight or more and 40 parts by weight or less relative to 100 parts by weight (anhydride basis) of zeolite. When the amount is less than 10 parts by weight, the compressive strength decreases, and when the amount is increased beyond 40 parts by weight, the compressive strength no longer improves and the amount of zeolite contained in the zeolite molding decreases, thereby degrading the adsorptive separation performance. To further increase the compressive strength, the amount is preferably 12 parts by weight or more and 30 parts by weight or less and more preferably 15 parts by weight or more and 25 parts by weight or less. The particle size of the clay is not particularly limited, but is preferably 0.5 μm or more and 30 μm or less in terms of average particle size and more preferably 1 μm or more and 25 μm or less in terms of average particle size. Examples of the clay include bentonite clay, sepiolite clay, attapulgite clay, palygorskite clay and synthetic layered silicate (smectite clay), and bentonite clay is preferable.

The clay contained in the high-strength zeolite molding is a clay having a solid acidity of 0.15 mmol/g or less as determined by a $NH_3$-TPD method, and at least one such clay is contained. When the solid acidity as determined by the $NH_3$-TPD method exceeds 0.15 mmol/g, there is a possibility that a reaction with an adsorbate would occur at the acid site derived from the clay. The solid acidity as determined by the $NH_3$-TPD method is preferably 0.10 mmol/g or less and more preferably 0.05 mmol/g or less.

In the present invention, the solid acidity of the clay as determined by the $NH_3$-TPD method is a value measured by a $NH_3$-TPD method that complies with "Solid Acidity Measurement by Temperature Programmed Desorption of Ammonia, Shokubai [Catalyst], vol. 42, p. 218 (2000)". In other words, the solid acidity of the clay as determined by the $NH_3$-TPD method in the present invention is a value obtained by measuring the amount of ammonia that desorbs at 100° C. or higher and 700° C. or lower from a sample which has been saturated with ammonia at room temperature. Specifically, a sample is saturated with ammonia by adsorption at room temperature and heated to 100° C. to remove ammonia remaining in the measurement atmosphere, and then the amount of ammonia measured during the temperature elevation process at a temperature elevation rate of 10° C./min up to 700° C. is assumed to be the solid acidity. A TCD detector may be used to measure the amount of ammonia. More specifically, the <Measurement of solid acidity by $NH_3$-TPD method> described below is used.

The high-strength zeolite molding of the present invention has a compressive strength of 20 N or more as measured with a Kiya-type rigidity meter. When the compressive strength is less than 20 N, powdering easily occurs, and the pressure loss and the adsorption efficiency may decrease.

A method for producing a high-strength zeolite molding according to the present invention (hereinafter, may also be referred to as the "production method of the present invention") comprises adding, to 100 parts by weight of zeolite, 10 parts by weight or more and 40 parts by weight or less of clay, 1 part by weight or more and 5 parts by weight or less of a molding aid, 0.5 parts by weight or more and 5 parts by weight or less of a water-soluble sodium salt and 60 parts by weight or more and 100 parts by weight or less of water, kneading the resulting mixture to obtain a kneaded product containing these, molding and then drying the kneaded product, disintegrating the obtained zeolite green body and then firing the disintegrated green body at 400° C. or higher and 700° C. or lower.

Zeolite contained in the kneaded product used in the production method of the present invention is a zeolite that has $Si/Al_2$ of 300 or more and 100000 or less and a water adsorption amount of 10 (g/100 g) or less under conditions of 25° C. and a relative pressure of 0.5, and at least one such zeolite is contained. When $Si/Al_2$ is less than 300, the affinity between the zeolite and water is high, and adsorption of VOC and the like may be obstructed. When the water adsorption amount under the conditions of 25° C. and a relative pressure of 0.5 exceeds 10 (g/100 g), the affinity between zeolite and water is high, and adsorption of VOC and the like may be obstructed. $Si/Al_2$ is preferably 500 or more and 10000 or less and more preferably 1000 or more and 2000 or less. Under the conditions of 25° C. and a relative pressure of 0.5, the water adsorption amount is preferably 5 (g/100 g) or less. Examples of the type of zeolite include beta zeolite, Y zeolite, L zeolite, ferrierite zeolite, mordenite zeolite and ZSM-5 zeolite, and ZSM-5 zeolite is preferable.

The clay contained in the kneaded product used in the production method of the present invention has a solid acidity of 0.15 mmol/g or less as determined by the $NH_3$-TPD method. When the solid acidity as determined by the $NH_3$-TPD method exceeds 0.15 mmol/g, there is a possibility that a reaction with an adsorbate would occur at the acid site derived from the clay. The solid acidity as determined by the $NH_3$-TPD method is preferably 0.10 mmol/g or less and more preferably 0.05 mmol/g or less.

Examples of the clay include bentonite clay, sepiolite clay, attapulgite clay, palygorskite clay and synthetic layered silicate (smectite clay), and bentonite clay is preferable.

The amount of the clay relative to 100 parts by weight (anhydride basis) of zeolite is 10 parts by weight or more and 40 parts by weight or less. When the amount is less than 10 parts by weight, the moldability is degraded, and when the amount is increased beyond 40 parts by weight, the moldability no longer improves. To further improve the moldability, the amount is preferably 12 parts by weight or more and 30 parts by weight or less and more preferably 15 parts by weight or more and 25 parts by weight or less. The particle size of the clay is not particularly limited, but is preferably 0.5 µm or more and 30 µm or less in terms of average particle size and more preferably 1 µm or more and 25 µm or less in terms of average particle size.

A molding aid is contained in the kneaded product used in the production method of the present invention. The molding aid improves moldability, and examples thereof include cellulose, alcohol, lignin, starch and guar gum. Among these, cellulose and alcohol are preferable due to their ease of handling. Examples of the cellulose include crystalline cellulose, hydroxypropyl methyl cellulose and sodium carboxymethyl cellulose (CMC). Examples of the alcohol include polyvinyl alcohol and ethylene glycol. The amount of the molding aid relative to 100 parts by weight (anhydride basis) of zeolite is 1 part by weight or more and 5 parts by weight or less and preferably 2 parts by weight or more and 4 parts by weight or less. At an amount less than 1 part by weight, the moldability is degraded, and at an amount exceeding 5 parts by weight, the compressive strength is degraded.

A water-soluble sodium salt is contained in the kneaded product used in the production method of the present invention. Examples of the water-soluble sodium salt include an inorganic acid sodium and an organic acid sodium. As the water-soluble sodium salt, at least one of an inorganic acid sodium or an organic acid sodium is preferably contained. Although the reason is not exactly clear, the use of a water-soluble sodium salt notably increases the compressive strength. The amount of the water-soluble sodium salt relative to 100 parts by weight (anhydride basis) of zeolite is 0.5 parts by weight or more and 5 parts by weight or less. At an amount less than 0.5 parts by weight, the effect thereof is not sufficient, and at an amount exceeding 5 parts by weight, the effect thereof no longer changes. In order not to increase the amount of sodium derived from the water-soluble sodium salt, the amount is preferably 0.5 parts by weight or more and 3 parts by weight or less and more preferably 0.5 parts by weight or more and 2 parts by weight or less.

The inorganic acid sodium may be any water-soluble sodium salt, and examples thereof include sodium phosphate, sodium silicate and sodium aluminate. Among these, sodium phosphate is preferable for the use due to its ease of handling. Examples of the sodium phosphate that can be used include sodium primary phosphate, sodium secondary phosphate, sodium tertiary phosphate, sodium pyrophosphate, acidic sodium pyrophosphate, sodium tripolyphosphate, sodium tetrapolyphosphate and sodium hexametaphosphate.

The organic acid sodium may be any water-soluble sodium salt, and examples thereof include general organic carboxylic acid, amino carbonate, ether carboxylate and vinyl-type polymer sodium salt. As the general carboxylic acid, for example, sodium citrate, sodium gluconate, sodium oxalate, sodium tartrate and the like can be used; as the amino carbonate, for example, sodium ethylenediaminetetraacetate, sodium diethylenetriaminopentaacetate and the like can be used; as the ether carboxylate, for example, sodium carboxymethyl tartronate, sodium carboxymethyl oxysuccinate and the like can be used; and as the vinyl-type polymer sodium salt, sodium polyacrylate, sodium salt of acrylic acid/maleic acid copolymer and the like can be used.

The amount of water contained in the kneaded product used in the production method of the present invention relative to 100 parts by weight (anhydride basis) of zeolite is 60 part by weight or more and 100 parts by weight or less and preferably 60 parts by weight or more and 90 parts by weight or less. At an amount less than 60 parts by weight and at an amount exceeding 100 parts by weight, molding may become difficult.

The kneaded product used in the production method of the present invention preferably contains a pore forming agent in order to improve the accessibility of the molding itself. A pore forming agent increases the macropore volume, and, for example, a water-soluble salt such as sodium carbonate or sodium hydrogen carbonate can be used. Alternatively, combustible powder such as crystalline cellulose, hydroxypropyl methyl cellulose, sodium carboxymethyl cellulose (CMC) and polyvinyl alcohol can be used. The pore forming agent is removed by washing with water, combustion or the like in a step after molding and contributes to increasing the macropore volume of the molding. The amount of the pore forming agent relative to 100 parts by weight (anhydride basis) of zeolite is 20 parts by weight or less and preferably 4 parts by weight or more and 10 parts by weight or less. The compressive strength slightly decreases by increasing the amount of the pore forming agent; however, since the macropore volume increases, it is important to balance the two.

The kneaded product used in the production method of the present invention is obtained by adding, to 100 parts by weight of zeolite, 10 parts by weight or more and 40 parts by weight or less of a particular clay, 1 part by weight or more and 5 parts by weight or less of a molding aid, 0.5 parts by weight or more and 5 parts by weight or less of a water-soluble sodium salt and 60 parts by weight or more and 100 parts by weight or less of water (or 20 parts by weight or less of a pore forming agent is further added), and then kneading the resulting mixture. The kneading method performed after addition is not particularly limited, and, for example, a mix-muller of a roll-type kneader, a Henschel mixer of a blade stirring type, a batch-type or continuous-type kneader or the like can be used.

The production method of the present invention involves molding the kneaded product obtained as described above. The molding method is not particularly limited, and molding can be performed by rolling granulation, stirring granulation, extrusion molding, spray granulation or a method that combines two or more of these, for example. The shape of the molding is not particularly limited but is preferably a spherical shape, a columnar shape, an elliptical shape, a bale shape, a trefoil shape, a ring shape or the like and is more preferably a columnar shape. The length of the molding is not particularly limited but is preferably 1 mm or more and 5 mm or less.

The molded zeolite green body is dried. The drying method is not particularly limited, and, for example, a box drier, a continuous drier or the like can be used. Drying can be performed at a drying temperature of 50° C. or higher and 200° C. or lower. Drying can be performed in a drying atmosphere of air or a nitrogen atmosphere at an atmospheric pressure. The dried zeolite green body is disintegrated into a desired size.

The dried zeolite green body is fired. The firing method is not particularly limited and can be performed in, for example, a device such as a box muffle furnace, a rotary kiln or a shaft kiln. The firing temperature is a temperature at which the fibrous clay is sintered and the strength can be exhibited, and is 400° C. or higher and 700° C. or lower. At a firing temperature lower than 400° C., the binder does not sinter and the strength decreases; however, at a temperature over 700° C., the extent of sintering does not change. Firing can be performed in a firing atmosphere of air or a nitrogen atmosphere at an atmospheric pressure.

EXAMPLES

The present invention will now be described in further detail through examples. However, the present invention is not limited by these examples.

<Measurement of Solid Acidity by $NH_3$-TPD Method>

0.1 g of a sample (clay) was left to stand still under helium stream at 500° C. to perform a pretreatment. The sample after 1 hour of pretreatment was put under a stream of a 10 vol % ammonia-90 vol % helium mix gas at room temperature so that the sample is saturated with ammonia by adsorption. After 1 hour under the mix gas stream, the sample was heated to 100° C. under a helium gas stream instead of the mix gas stream. After the temperature elevation, helium gas was caused to flow at 100° C. for 1 hour to remove ammonia remaining in the atmosphere. After removal of remaining ammonia, the temperature was elevated at a temperature elevation rate of 10° C./min up to 700° C. under a helium stream at a flow rate of 50 mL/minute, and the amount of ammonia was measured during this temperature elevation process by using a TCD detector and was assumed to be the amount of ammonia that had been adsorbed on the sample. The amount of adsorbed ammonia per unit mass of the sample was assumed to be the solid acidity (mmol/g).

<Measurement of Average Particle Size of Clay>

0.5 g of a sample (clay) was placed in 50 g of water that was being stirred at high speed and was dispersed by stirring for a while. The average particle size was measured with a microtrac particle size distribution meter (MT3000II: product of MicrotracBEL Corp.). Here, the average particle size refers to a D50 size.

<Measurement of Compressive Strength>

The compressive strength was measured with a Kiya-type rigidity meter (KHT-20N: product of FUJIWARA SCIENTIFIC CO., LTD.). The average value of 25 was used as the compressive strength.

Example 1

100 parts by weight (103 g, water content: 3%) of an MFI zeolite powder (HSZ (registered trademark)-891HOA: product of TOSOH CORPORATION ($Si/Al_2$: 1500, water adsorption amount: 4 (g/100 g))), 20 parts by weight (22.2 g, water content: 10%, solid acidity as determined by $NH_3$-TPD method (hereinafter may also referred to as simply "solid acidity"): 0.009 mmol/g, average particle size: 1.8 μm) of bentonite clay (KUNIPIA F: product of KUNIMINE INDUSTRIES CO., LTD.), 3 parts by weight (3 g) of sodium carboxymethyl cellulose (molding aid, CELLOGEN: product of DKS Co., Ltd.) and 1 part by weight (1 g) of sodium polyacrylate (DL-40S: product of NIPPON SHOKUBAI CO., LTD.) were weighed and mixed in a kneader (HIVIS MIX: product of PRIMIX Corporation) for 5 minutes. 68 parts by weight (68 g) of water was added, and kneading was continued until the kneaded product became coherent. The obtained kneaded product was molded into a columnar shape having a diameter of 1.5 mm. Subsequently, drying was performed at 100° C. for 12 hours or longer and disintegration was performed to about 1 to 3 mm. Subsequently, firing was performed at 650° C. for 3 hours to obtain a zeolite molding (clay relative to 100 parts by weight of zeolite: 20 parts by weight, $Si/Al_2$ of zeolite: 1500, water adsorption amount of zeolite: 4 (g/100 g), solid acidity of clay: 0.009 mmol/g, average particle size of clay: 1.8 μm). The compressive strength was 37 N.

Example 2

100 parts by weight (103 g, water content: 3%) of an MFI zeolite powder (HSZ (registered trademark)-891HOA: product of TOSOH CORPORATION ($Si/Al_2$: 1500, water adsorption amount: 4 (g/100 g))), 20 parts by weight (23.0 g, water content: 13%, solid acidity: 0.134 mmol/g, average particle size: 23 μm) of bentonite clay (KUNIBOND: product of KUNIMINE INDUSTRIES CO., LTD.), 3 parts by weight (3 g) of sodium carboxymethyl cellulose (molding aid, CELLOGEN: product of DKS Co., Ltd.) and 1 part by weight (1 g) of sodium polyacrylate (DL-40S: product of NIPPON SHOKUBAI CO., LTD.) were weighed and mixed in a kneader (HIVIS MIX: product of PRIMIX Corporation) for 5 minutes. 70 parts by weight (70 g) of water was added, and kneading was continued until the kneaded product became coherent. The obtained kneaded product was molded into a columnar shape having a diameter of 1.5 mm. Subsequently, drying was performed at 100° C. for 12 hours or longer and disintegration was performed to about 1 to 3 mm. Subsequently, firing was performed at 650° C. for 3 hours to obtain a zeolite molding (clay relative to 100 parts by weight of zeolite: 20 parts by weight, $Si/Al_2$ of zeolite: 1500, water adsorption amount of zeolite: 4 (g/100 g), solid acidity of clay: 0.134 mmol/g, average particle size of clay: 23 μm). The compressive strength was 28 N.

Example 3

100 parts by weight (103 g, water content: 3%) of an MFI zeolite powder (HSZ (registered trademark)-891HOA: product of TOSOH CORPORATION ($Si/Al_2$: 1500, water adsorption amount: 4 (g/100 g))), 20 parts by weight (22.6 g, water content: 12%, solid acidity: 0.045 mmol/g, average particle size: 8.8 μm) of bentonite clay (NEOKUNIBOND: product of KUNIMINE INDUSTRIES CO., LTD.), 3 parts by weight (3 g) of sodium carboxymethyl cellulose (molding aid, CELLOGEN: product of DKS Co., Ltd.) and 1 part by weight (1 g) of sodium polyacrylate (DL-40S: product of NIPPON SHOKUBAI CO., LTD.) were weighed and mixed in a kneader (HIVIS MIX: product of PRIMIX Corporation) for 5 minutes. 67 parts by weight (67 g) of water was added, and kneading was continued until the kneaded product became coherent. The obtained kneaded product was molded into a columnar shape having a diameter of 1.5 mm. Subsequently, drying was performed at 100° C. for 12 hours or longer and disintegration was performed to about 1 to 3 mm. Subsequently, firing was performed at 650° C. for 3 hours to obtain a zeolite molding (clay relative to 100 parts by weight of zeolite: 20 parts by weight, $Si/Al_2$ of zeolite: 1500, water adsorption amount of zeolite: 4 (g/100 g), solid acidity of clay: 0.045 mmol/g, average particle size of clay: 8.8 μm). The compressive strength was 28 N.

Example 4

100 parts by weight (103 g, water content: 3%) of an MFI zeolite powder (HSZ (registered trademark)-891HOA: product of TOSOH CORPORATION ($Si/Al_2$: 1500, water adsorption amount: 4 (g/100 g))), 20 parts by weight (24 g, water content: 17%, solid acidity: 0.01 mmol/g, average particle size: 6.4 μm) of bentonite clay (OPTIGEL-CK: product of BYK-Chemie GmbH), 3 parts by weight (3 g) of sodium carboxymethyl cellulose (molding aid, CELLOGEN: product of DKS Co., Ltd.) and 1 part by weight (1 g) of sodium polyacrylate (DL-40S: product of NIPPON SHOKUBAI CO., LTD.) were weighed and mixed in a kneader (HIVIS MIX: product of PRIMIX Corporation) for 5 minutes. 66 parts by weight (66 g) of water was added, and kneading was continued until the kneaded product became coherent. The obtained kneaded product was molded into a columnar shape having a diameter of 1.5 mm. Subsequently, drying was performed at 100° C. for 12 hours or longer and disintegration was performed to about 1 to 5 mm. Subsequently, firing was performed at 650° C. for 3 hours to obtain a zeolite molding (clay relative to 100 parts by weight of zeolite: 20 parts by weight, $Si/Al_2$ of zeolite: 1500, water adsorption amount of zeolite: 4 (g/100 g), solid acidity of clay: 0.01 mmol/g, average particle size of clay: 6.4 μm). The compressive strength was 39 N.

Example 5

100 parts by weight (103 g, water content: 3%) of an MFI zeolite powder (HSZ (registered trademark)-891HOA: product of TOSOH CORPORATION ($Si/Al_2$: 1500, water adsorption amount: 4 (g/100 g))), 20 parts by weight (22.2 g, water content: 10%, solid acidity: 0.009 mmol/g, average particle size: 1.8 μm) of bentonite clay (KUNIPIA F: product of KUNIMINE INDUSTRIES CO., LTD.), 3 parts by weight (3 g) of sodium carboxymethyl cellulose (molding aid, CELLOGEN: product of DKS Co., Ltd.), 1 part by weight (1 g) of sodium polyacrylate (DL-40S: product of NIPPON SHOKUBAI CO., LTD.) and 2 parts by weight (2 g) of crystalline cellulose (pore forming agent, CEOLUS (registered trademark) RC-591: product of Asahi Kasei Chemicals Corporation) were weighed and mixed in a kneader (HIVIS MIX: product of PRIMIX Corporation) for 5 minutes. 74 parts by weight (74 g) of water was added, and kneading was continued until the kneaded product became coherent. The obtained kneaded product was molded into a columnar shape having a diameter of 1.5 mm. Subsequently, drying was performed at 100° C. for 12 hours or longer and disintegration was performed to about 1 to 3 mm. Subsequently, firing was performed at 650° C. for 3 hours to obtain a zeolite molding (clay relative to 100 parts by weight of zeolite: 20 parts by weight, $Si/Al_2$ of zeolite: 1500, water adsorption amount of zeolite: 4 (g/100 g), solid acidity of clay: 0.009 mmol/g, average particle size of clay: 1.8 μm). The compressive strength was 42 N.

Example 6

100 parts by weight (103 g, water content: 3%) of an MFI zeolite powder (HSZ (registered trademark)-891HOA: product of TOSOH CORPORATION ($Si/Al_2$: 1500, water adsorption amount: 4 (g/100 g))), 20 parts by weight (22.2 g, water content: 10%, solid acidity: 0.009 mmol/g, average particle size: 1.8 μm) of bentonite clay (KUNIPIA F: product of KUNIMINE INDUSTRIES CO., LTD.), 3 parts by weight (3 g) of sodium carboxymethyl cellulose (molding aid, CELLOGEN: product of DKS Co., Ltd.) 1 part by weight (1 g) of sodium polyacrylate (DL-40S: product of NIPPON SHOKUBAI CO., LTD.) and 4 parts by weight (4 g) of crystalline cellulose (pore forming agent, CEOLUS (registered trademark) RC-591: product of Asahi Kasei Chemicals Corporation) were weighed and mixed in a kneader (HIVIS MIX: product of PRIMIX Corporation) for 5 minutes. 74 parts by weight (74 g) of water was added, and kneading was continued until the kneaded product became coherent. The obtained kneaded product was molded into a columnar shape having a diameter of 1.5 mm. Subsequently, drying was performed at 100° C. for 12 hours or longer and disintegration was performed to about 1 to 3 mm. Subsequently, firing was performed at 650° C. for 3 hours to obtain a zeolite molding (clay relative to 100 parts by weight of zeolite: 20 parts by weight, $Si/Al_2$ of zeolite: 1500, water adsorption amount of zeolite: 4 (g/100 g), solid acidity of clay: 0.009 mmol/g, average particle size of clay: 1.8 μm). The compressive strength was 38 N.

Example 7

100 parts by weight (103 g, water content: 3%) of an MFI zeolite powder (HSZ (registered trademark)-891HOA: product of TOSOH CORPORATION ($Si/Al_2$: 1500, water adsorption amount: 4 (g/100 g))), 20 parts by weight (22.2 g, water content: 10%, solid acidity: 0.009 mmol/g, average particle size: 1.8 μm) of bentonite clay (KUNIPIA F: product of KUNIMINE INDUSTRIES CO., LTD.), 3 parts by weight (3 g) of sodium carboxymethyl cellulose (molding aid, CELLOGEN: product of DKS Co., Ltd.) 1 part by weight (1 g) of sodium polyacrylate (DL-40S: product of NIPPON SHOKUBAI CO., LTD.) and 8 parts by weight (8 g) of crystalline cellulose (pore forming agent, CEOLUS (registered trademark) RC-591: product of Asahi Kasei Chemicals Corporation) were weighed and mixed in a kneader (HIVIS MIX: product of PRIMIX Corporation) for 5 minutes. 82 parts by weight (82 g) of water was added, and kneading was continued until the kneaded product became coherent. The obtained kneaded product was molded into a columnar shape having a diameter of 1.5 mm. Subsequently, drying was performed at 100° C. for 12 hours or longer and disintegration was performed to about 1 to 3 mm. Subsequently, firing was performed at 650° C. for 3 hours to obtain a zeolite molding (clay relative to 100 parts by weight of zeolite: 20 parts by weight, $Si/Al_2$ of zeolite: 1500, water adsorption amount of zeolite: 4 (g/100 g), solid acidity of clay: 0.009 mmol/g, average particle size of clay: 1.8 μm). The compressive strength was 33 N.

Comparative Example 1

100 parts by weight (103 g, water content: 3%) of an MFI zeolite powder (HSZ (registered trademark)-891HOA: product of TOSOH CORPORATION ($Si/Al_2$: 1500, water adsorption amount: 4 (g/100 g))), 20 parts by weight (25.5 g, water content: 22%, solid acidity: 0.197 mmol/g, average particle size: 11.6 μm) of attapulgite clay (MINIGEL MB: product of Active Minerals CO., LTD.), 3 parts by weight (3 g) of sodium carboxymethyl cellulose (molding aid, CELLOGEN: product of DKS Co., Ltd.) and 1 part by weight (1 g) of sodium polyacrylate (DL-40S: product of NIPPON SHOKUBAI CO., LTD.) were weighed and mixed in a kneader (HIVIS MIX: product of PRIMIX Corporation) for 5 minutes. 94 parts by weight (94 g) of water was added, and kneading was continued until the kneaded product became coherent. The obtained kneaded product was molded into a columnar shape having a diameter of 1.5 mm. Subsequently, drying was performed at 100° C. for 12 hours or longer and disintegration was performed to about 1 to 3 mm. Subsequently, firing was performed at 650° C. for 3 hours to obtain a zeolite molding (clay relative to 100 parts by weight of zeolite: 20 parts by weight, $Si/Al_2$ of zeolite: 1500, water adsorption amount of zeolite: 4 (g/100 g), solid acidity of clay: 0.197 mmol/g, average particle size of clay: 11.6 μm). The compressive strength was 15 N.

All contents of the description, the claims, the drawings, and the abstract of Japanese Patent Application No. 2019-114469 filed Jun. 20, 2019 are incorporated in the disclosure of the description of the present invention by reference.

INDUSTRIAL APPLICABILITY

According to the high-strength zeolite molding of the present invention, since the binder acidity is low and the reactivity with organic substances is low, the high-strength zeolite molding can be used in adsorptive separation usages without causing side reaction; furthermore, since the strength is high, powdering rarely occurs even when the molding is used in the adsorptive separation, and equipment malfunction and the like rarely occur.

The invention claimed is:

1. A high-strength zeolite molding comprising 10 parts by weight or more and 40 parts by weight or less of clay relative to 100 parts by weight of zeolite, and having a compressive strength of 20 N or more, wherein the zeolite contains at least one zeolite that has $Si/Al_2$ of 300 or more and 100000 or less and a water adsorption amount of 10 (g/100 g) or less under conditions of 25° C. and a relative pressure of 0.5, and the clay contains at least one clay that has a solid acidity of 0.15 mmol/g or less as determined by a $NH_3$-TPD method.

2. A method for producing the high-strength zeolite molding according to claim 1, the method comprising forming a mixture by adding, to 100 parts by weight of zeolite, 10 parts by weight or more and 40 parts by weight or less of clay, 1 part by weight or more and 5 parts by weight or less of a molding aid, 0.5 parts by weight or more and 5 parts by weight or less of a water-soluble sodium salt and 60 parts by weight or more and 100 parts by weight or less of water, kneading the mixture to obtain a kneaded product, molding and then drying the kneaded product, disintegrating the obtained kneaded product and then firing the disintegrated kneaded product at 400° C. or higher and 700° C. or lower, wherein the zeolite contains at least one zeolite that has $Si/Al_2$ of 300 or more and 100000 or less and a water adsorption amount of 10 (g/100 g) or less under conditions of 25° C. and a relative pressure of 0.5, and the clay contains at least one clay that has a solid acidity of 0.15 mmol/g or less as determined by a $NH_3$-TPD method.

3. The method for producing the high-strength zeolite molding according to claim 2, wherein 20 parts by weight or less of a pore forming agent is further added to 100 parts by weight of the zeolite.

4. The method for producing the high-strength zeolite molding according to claim 2, wherein the zeolite contains at least one zeolite selected from beta zeolite, Y zeolite, L zeolite, ferrierite zeolite, mordenite zeolite and ZSM-5 zeolite.

5. The method for producing the high-strength zeolite molding according to claim 2, wherein the clay contains at least one selected from bentonite clay, sepiolite clay, attapulgite clay, palygorskite clay and synthetic layered silicate (smectite clay).

* * * * *